(12) United States Patent
Mesropian et al.

(10) Patent No.: US 8,301,608 B1
(45) Date of Patent: Oct. 30, 2012

(54) REAL-TIME ACCESS OF OPPORTUNISTICALLY LOCKED FILES WITHOUT BREAKING OPPORTUNISTIC LOCKS

(75) Inventors: Haik Mesropian, Glendale, CA (US); Wesley Jordan, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 102 days.

(21) Appl. No.: 12/916,089

(22) Filed: Oct. 29, 2010

(51) Int. Cl.
*G06F 12/00* (2006.01)
*G06F 17/00* (2006.01)

(52) U.S. Cl. ........................ 707/704; 711/168
(58) Field of Classification Search .............. 707/823, 707/825, 999.203, 704; 709/225; 710/36, 710/54; 711/141, 168
See application file for complete search history.

(56) References Cited

U.S. PATENT DOCUMENTS

| | | | | |
|---|---|---|---|---|
| 6,385,701 B1* | 5/2002 | Krein et al. | ............ | 711/141 |
| 6,654,794 B1* | 11/2003 | French | ............ | 709/217 |
| 7,844,973 B1* | 11/2010 | Dice | ............ | 707/799 |
| 8,005,953 B2* | 8/2011 | Miloushev et al. | ............ | 709/225 |
| 8,121,061 B2* | 2/2012 | Rajaram et al. | ............ | 370/282 |
| 2010/0192227 A1* | 7/2010 | Dai et al. | ............ | 726/24 |

* cited by examiner

*Primary Examiner* — Marc Filipczyk
(74) *Attorney, Agent, or Firm* — Brill Law Office; Jeffrey Brill

(57) ABSTRACT

Opportunistically locked files are accessed in real-time from a kernel mode file system filter driver without breaking opportunistic locks. A file system is monitored, and the granting of an opportunistic lock to a specific file object referring to a specific underlying file is detected. The granting of the detected opportunistic lock results in both the file object and the underlying file being opportunistically locked. A reference to the opportunistically locked file object is cached. The file system filter driver filters a request to access the opportunistically locked file via a second file object which is not opportunistically locked. The kernel mode file system filter driver uses the cached reference to access the opportunistically locked underlying file. This enables access of the opportunistically locked file from the kernel mode file system filter driver without breaking the opportunistic lock.

18 Claims, 4 Drawing Sheets

REAL-TIME ACCESS OF OPPORTUNISTICALLY LOCKED FILES WITHOUT BREAKING OPPORTUNISTIC LOCKS

TECHNICAL FIELD

This disclosure pertains generally to computer file system internals, and more specifically to providing real-time access to opportunistically locked files without breaking the opportunistic locks.

BACKGROUND

Opportunistic Locking

Microsoft Windows NT® and related operating systems support a feature called opportunistic locking. A request for an opportunistic lock (oplock) of a file object indicates that content of the file represented by the file object must be coherent while the oplock is held. Requests to open the file that can potentially access stale data should attempt to break the opportunistic lock thus forcing the oplock owner to commit content changes to the file if there are any. The opportunistic lock is associated with the file object owned by the requester. When the requester is done accessing the file, the cached modifications, if any, are made to the file, and the oplock is released. However, if an attempt is made to access an opportunistically locked file through a second file object (e.g., by another process), the oplock is typically broken, the cached modifications are made to the file, and the modified file is made available via the second file object. Thus, the lock is opportunistic, in that it is provided while feasible, but a second request to access the file can be accommodated before the first requester has let the oplock release naturally. The opportunistic locking functionality is implemented by a layer of the file system, and maintains the coherency of the file content. It is to be noted that opportunistic locking is distinct from standard deny-mode locking, in which only a single process is allowed write access to a given file at a time, and write requests by additional processes are simply denied while the deny-mode lock is in place.

Kernel Mode File System Filter Drivers

A kernel mode file system filter driver intercepts access requests directed to a file system, before the requests reach their intended targets. By intercepting requests to access files, the file system filter driver can extend or replace functionality provided by the original target of the request. A file system filter driver can be used to perform operations such as scanning files for malicious code (e.g., viruses, worms, etc.), backing up files, encrypting files, etc.

Files that are opportunistically locked cannot be reliably read from or written to from a file system filter driver in real-time, due to the possibility of breaking the coherency of the file content and deadlocking the operating system. Therefore, file system filter drivers conventionally skip accessing opportunistically locked files, and the skipped operations are performed asynchronously at a later time after the oplock has been released. However, if the access of an opportunistically locked file is skipped until later as opposed to being performed in real-time, there is a possibility of the file being modified before the core functionality of the file system filter driver is applied to the content of the file. This can result in problems such as a security vulnerability where the file system filter driver is being used to detect malicious code, or an un-backed up file where the file system filter driver is being used in a backup context.

Another conventional method of accessing an opportunistically locked file is via a separate file object which, as described above, forces the oplock to break. Forcing the oplock to break presents a problem for a file system filter based application in that the file system filter driver becomes obtrusive, and is no longer transparent. This is not acceptable in the case of a background based filter performing actions such as scanning for viruses or backing up files, because it is desirable that such background tasks be performed transparently.

It would be desirable to address these issues.

SUMMARY

Opportunistically locked files are accessed in real-time from a kernel mode file system filter driver without breaking the opportunistic locks. More specifically, a file system is monitored, for example by monitoring file system control codes indicative of oplock status. By monitoring the file system, the granting of an opportunistic lock to a specific file object referring to a specific underlying file is detected. The granting of the detected opportunistic lock results in both the specific file object and the specific underlying file being opportunistically locked. A reference to the specific opportunistically locked file object is cached, for example in the stream context describing the specific opportunistically locked underlying file on disk.

The kernel mode file system filter driver filters a request to access the specific opportunistically locked file via a second file object which is not opportunistically locked. The kernel mode file system filter driver uses the cached reference to access the specific opportunistically locked underlying file. This enables access of the specific opportunistically locked underlying file from the kernel mode file system filter driver without breaking the granted opportunistic lock. The kernel mode file system filter driver can use the cached reference to the specific opportunistically locked file object to access the specific opportunistically locked underlying file to perform processing functionality provided by the kernel mode file system filter driver, such as scanning the opportunistically locked file for malicious code or backing up the opportunistically locked file. The kernel mode file system filter driver can also use the cached reference to access the opportunistically locked file to perform redirected filtered input/output.

The releasing of the opportunistic lock of the specific file object referring to the specific underlying file is detected. The detected releasing of the opportunistic lock results in both the specific file object and the specific underlying file no longer being opportunistically locked. In response, the cached reference to the specific opportunistically locked file object is released.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
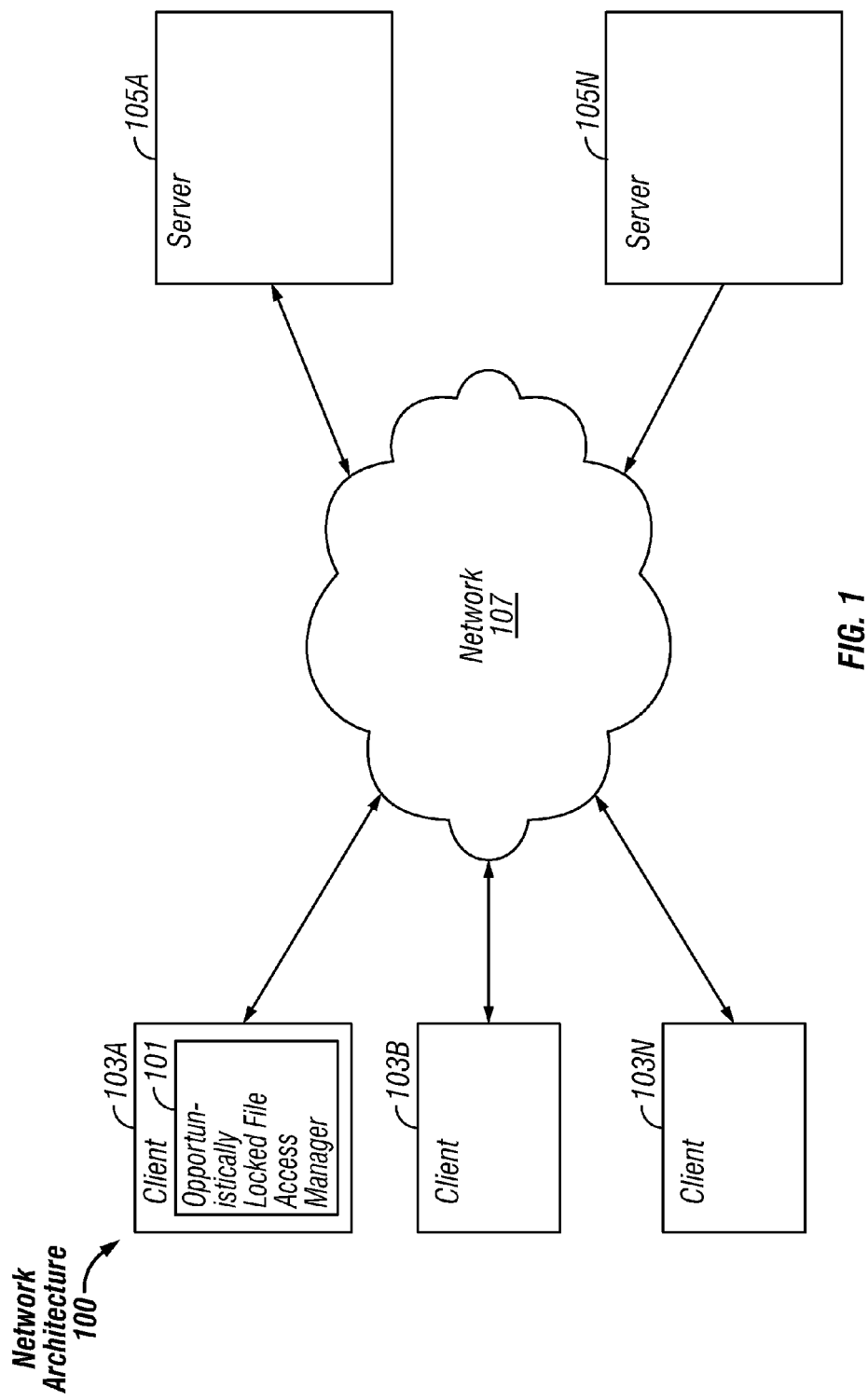
FIG. 1 is a block diagram of an exemplary network architecture in which an opportunistically locked file access manager can be implemented, according to some embodiments.

FIG. 1 is a block diagram illustrating an exemplary network architecture 100 in which an opportunistically locked file access manager 101 can be implemented. The illustrated network architecture 100 comprises multiple clients 103A, 103B and 103N, as well as multiple servers 105A and 105N. In FIG. 1, the opportunistically locked file access manager 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
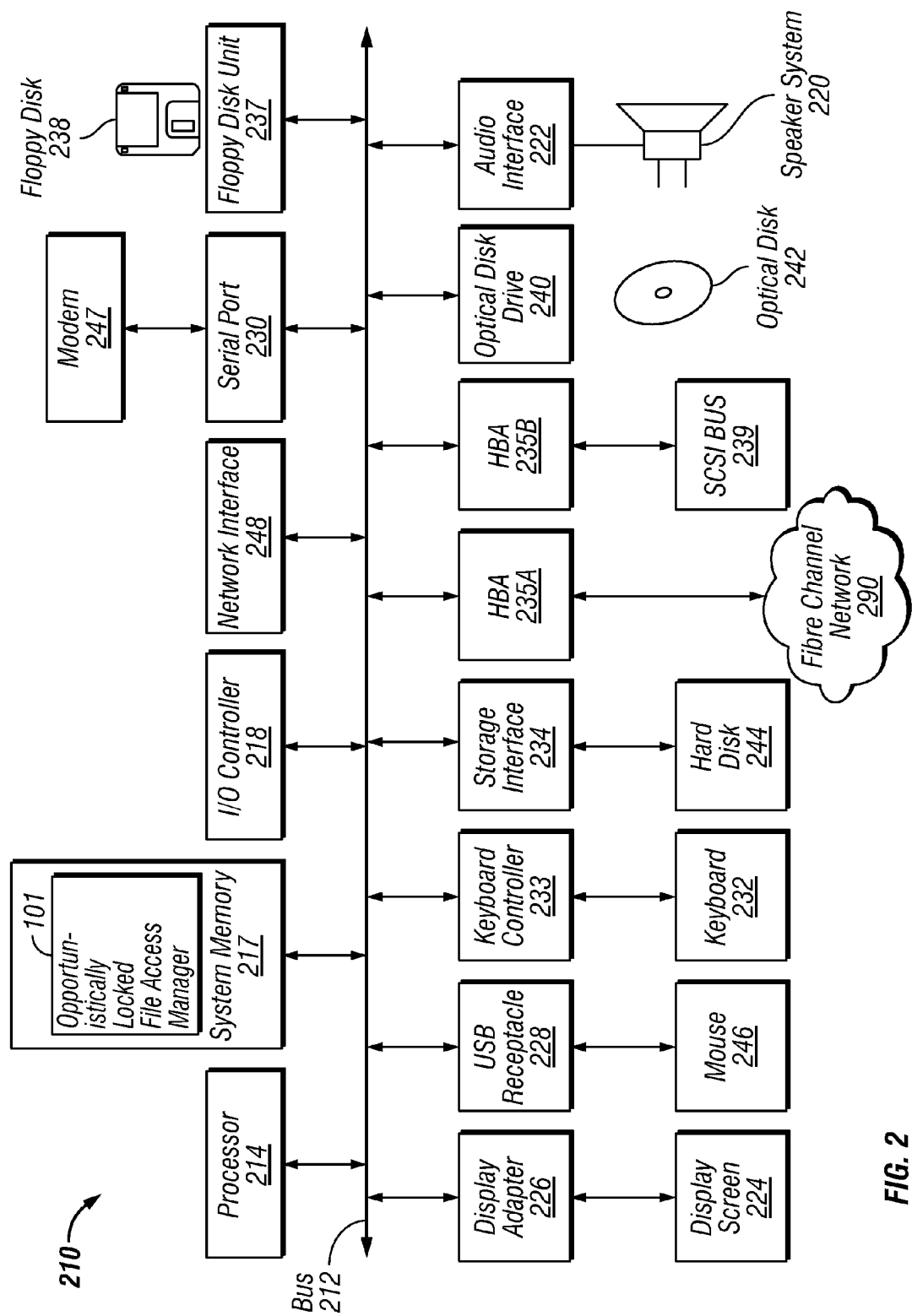
FIG. 2 is a block diagram of a computer system suitable for implementing an opportunistically locked file access manager, according to some embodiments.

FIG. 2 is a block diagram of a computer system 210 suitable for implementing an opportunistically locked file access manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the opportunistically locked file access manager 101 is illustrated as residing in system memory 217. The workings of the opportunistically locked file access manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
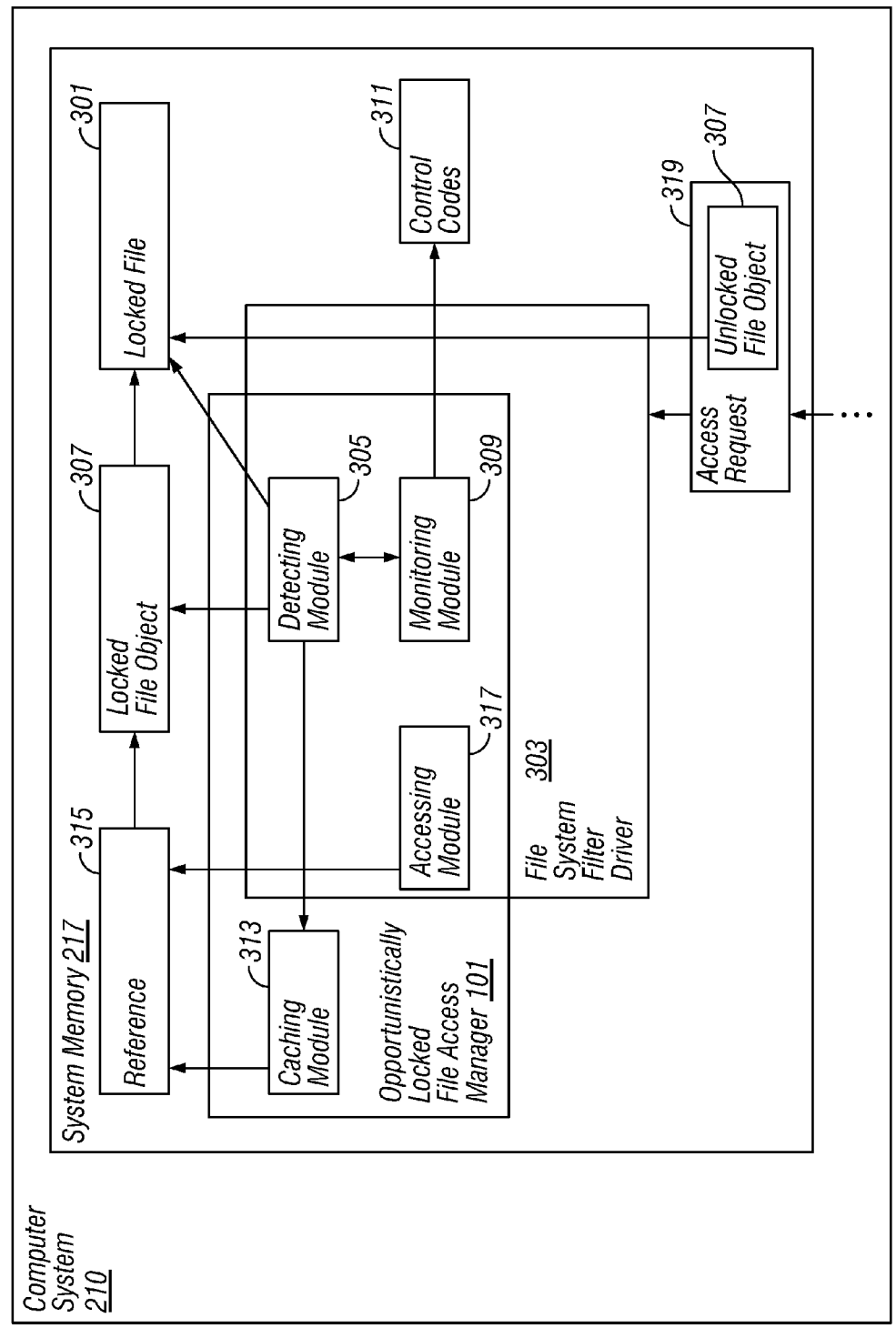
FIG. 3 is a block diagram of the operation of an opportunistically locked file access manager, according to some embodiments.

FIG. 3 illustrates the operation of an opportunistically locked file access manager 101 residing in the system memory 217 of a client computer 103, according to some embodiments. As described above, the functionalities of the opportunistically locked file access manager 101 can reside on a client 103, a server 105, or be distributed between multiple computer systems 210, including within a cloud-based computing environment in which the functionality of the opportunistically locked file access manager 101 is provided as a service over a network 107. It is to be understood that although the opportunistically locked file access manager 101 is illustrated in FIG. 3 as a single entity, the illustrated opportunistically locked file access manager 101 represents a collection of functionalities, which can be instantiated as a single or multiple modules as desired (an instantiation of specific, multiple modules of the opportunistically locked file access manager 101 is illustrated in FIG. 3). It is to be understood that the modules of the opportunistically locked file access manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the opportunistically locked file access manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As noted above, under Windows NT® and related operating systems, oplocks are associated with file objects 307. When an oplock is granted to a file object 307, both the file object 307 and the underlying file 301 can be described as being opportunistically locked. It is to be understood that the same underlying opportunistically locked file 301 can be referenced by one or more separate file objects 307 that are not associated with oplocks. As noted above, using a non-oplocked file object 307 to access an opportunistically locked file 301 breaks the oplock.

As understood by those of ordinary skill in the relevant art, the term "file object" means an indicator for accessing an underlying file. It is also to be understood that under Windows the term "file object" 307 is used in the context of kernel mode. In the context of user mode, a file object 307 is called a "file handle." Herein, the term file object 307 is used throughout because the file system filter 303 driver is running in kernel mode. However, it is to be understood that at the user level (at which access attempts being filtered typically occur) the term file handle would be used.

As illustrated in FIG. 3, the opportunistically locked file access manager 101 enables reading from and writing to opportunistically locked files 301 in real-time from a kernel mode file system filter driver 303, without breaking the corresponding oplocks. The opportunistically locked file access manager 101 uses the file object 307 associated with the oplock for reading and/or writing from/to the opportunistically locked file 301, and thus does not require breaking the oplock to access the file 301 in real-time.

More specifically, a monitoring module 309 of the opportunistically locked file access manager 101 monitors the file system. A detecting module 305 of the opportunistically locked file access manager 101 works in conjunction with the monitoring module 309 and detects the granting and releasing of oplocks. By detecting and keeping track of which file objects 307 referring to which underlying files 301 are oplocked, the opportunistically locked file access manager 101 can use those file objects 307 to access the oplocked files 301 in real-time without breaking the oplocks. In Windows NT® and operating systems based thereon, whenever a file object 307 is granted or releases an oplock, a corresponding file system control code 311 indicative of oplock status is set accordingly. In one embodiment, it is these file system control codes 311 that are monitored by the monitoring module 309 (as illustrated). In other embodiments, other internal file systems attributes (not illustrated) are monitored to track oplocked file objects 307.

When the detecting module 305 detects a file object 307 being successfully oplocked, a caching module 313 of the opportunistically locked file access manager 101 caches a reference 315 to the file object 307 for accessing the underlying oplocked file 301. In one embodiment, the caching module 313 caches this reference 315 to the file object 307 in the stream context describing the oplocked file 301 on disk 234. Since the stream context is unique for all open file objects 307 targeting the given file 301 on disk 234, the cached reference 315 to the oplocked file object 307 can be used from the file system filter driver 303 for all filtered input/out (IO) requests targeting that file 301, regardless of the file object 307 being used for the filtered IO. In other words, the cached reference 315 can be used to access the oplocked file 301 for all filtered IO from the file system filter driver 303.

Whenever the file system filter driver 303 filters a file access request 319 targeting an opportunistically locked file 301, an accessing module 317 of the opportunistically locked file access manager 101 uses the cached reference 315 to the oplocked file object 307 to access the underlying targeted file 301 from the file system filter driver 303. The accessing module 317 uses this cached reference 315 to access the underlying file both for the processing functionality provided by the file system filter driver 303 (e.g., malicious code scanning, backup, etc.) as well as for the redirected filtered IO. In other words, whenever the file system filter driver 303 is filtering 10 targeting an oplocked file 301 via a non-oplocked file object 307, instead of using the file object 307 of the filtered IO (the use of which would break the oplock), the accessing module 317 uses the cached reference 315 to the oplocked file object 307. Because the accessing module 317 uses the cached reference 315 to the oplocked file object 307 instead of the non-oplocked file object 307 being used by the filtered IO, the oplocked file 301 can be successfully accessed without breaking the oplock, and without having to wait until the oplock is released naturally. Thus, the oplocked filed 301 is transparently accessed from the file system filter driver 303, without breaking the oplock.

In conjunction with the monitoring module 309, the detecting module 305 also detects when oplocks associated with specific file objects 307 are released (e.g., when a file object 307 that is opportunistically locked is closed). In one embodiment, the monitoring module 309 monitors file system control codes 311 to enable the detecting module 305 to make these determinations. When the detecting module 305 detects that a specific file object 307 is no longer opportunistically locked, in response the caching module 313 releases the cached reference 315 to the file object 307 and clears the cache stored in the stream context.

Figure 4:
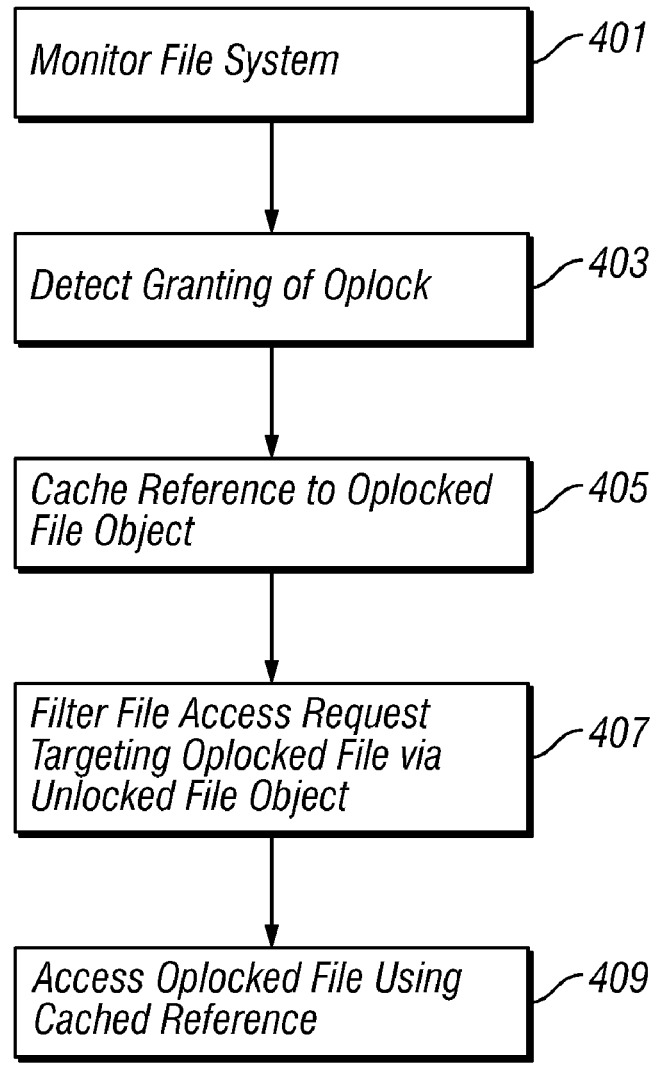
FIG. 4 is a flowchart of the operation of an opportunistically locked file access manager, according to some embodiments.

FIG. 4 illustrates steps for the operation of an opportunistically locked file access manager 101 (FIG. 1), according to some embodiments. A monitoring module 309 (FIG. 3) of the opportunistically locked file access manager 101 (FIG. 1) monitors 401 the file system. Working in conjunction with the monitoring module 309 (FIG. 3), a detecting module 305 (FIG. 3) of the opportunistically locked file access manager 101 (FIG. 1) detects 403 the granting of an oplock to a specific file object 307 (FIG. 3) referring to a specific underlying file 301 (FIG. 3). A caching module 313 (FIG. 3) of the opportunistically locked file access manager 101 (FIG. 1) caches 405 a reference 315 (FIG. 3) to the oplocked file object 307 (FIG. 3) for accessing the specific underlying oplocked file 301 (FIG. 3). The file system filter driver 303 (FIG. 3) filters 407 a file access request 319 (FIG. 3) targeting the opportunistically locked file 301 (FIG. 3) via a second file object 307 (FIG. 3) that is not oplocked. An accessing module 317 (FIG. 3) of the opportunistically locked file access manager 101 (FIG. 1) accesses 409 the underlying targeted file 301 (FIG. 3) from the file system filter driver 303 (FIG. 3) in real-time without breaking the oplock by using the cached reference 315 (FIG. 3) to the oplocked file object 307 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for accessing opportunistically locked files in real-time from a kernel mode file system filter driver without breaking opportunistic locks, the method comprising the steps of:
   monitoring a file system, by at least one computer, by monitoring file system control codes indicative of opportunistic lock ("oplock") status;
   detecting, by the at least one computer, a granting of an opportunistic lock to a specific file object referring to a specific underlying file, the granting of the opportunistic lock resulting in the specific file object and the specific underlying file being opportunistically locked;
   caching, by the at least one computer, a reference to the specific opportunistically locked file object;
   filtering, by the kernel mode file system filter driver, a request to access the specific opportunistically locked file via a second file object, the second file object not being opportunistically locked; and
   using, by the kernel mode file system filter driver, the cached reference to the specific opportunistically locked file object instead of the second file object to access the specific opportunistically locked underlying file;
   wherein using the cached reference to the specific opportunistically locked file object to access the specific opportunistically locked underlying file further comprises accessing the specific opportunistically locked underlying file in real-time from the kernel mode file system filter driver without breaking the granted opportunistic lock.

2. The method of claim 1 wherein caching, by the at least one computer, the reference to the specific opportunistically locked file object further comprises:
   caching, by the at least one computer, the reference to the specific opportunistically locked file object in a stream context describing the specific opportunistically locked underlying file on disk.

3. The method of claim 1 wherein using, by the kernel mode file system filter driver, the cached reference to the specific opportunistically locked file object instead of the second file object to access the specific opportunistically locked underlying file further comprises:
   using, by the kernel mode file system filter driver, the cached reference to the specific opportunistically locked file object instead of the second file object to access the specific opportunistically locked underlying file and perform processing functionality provided by the kernel mode file system filter driver to the specific opportunistically locked underlying file.

4. The method of claim 3 wherein performing the processing functionality provided by the kernel mode file system filter driver to the specific opportunistically locked underlying file further comprises:
   scanning the specific opportunistically locked underlying file for malicious code, by the kernel mode file system filter driver.

5. The method of claim 3 wherein performing the processing functionality provided by the kernel mode file system filter driver to the specific opportunistically locked underlying file further comprises:
   backing up the specific opportunistically locked underlying file, by the kernel mode file system filter driver.

6. The method of claim 1 wherein using, by the kernel mode file system filter driver, the cached reference to the specific opportunistically locked file object instead of the second file object to access the specific opportunistically locked underlying file further comprises:
   using, by the kernel mode file system filter driver, the cached reference to the specific opportunistically locked file object instead of the second file object to access the specific opportunistically locked underlying file and perform redirected filtered input/output to the specific opportunistically locked underlying file.

7. The method of claim 1 further comprising:
   detecting, by the at least one computer, a releasing of an opportunistic lock of the specific file object referring to the specific underlying file, the releasing of the opportunistic lock resulting in the specific file object and the specific underlying file not being opportunistically locked; and
   releasing, by the at least one computer, the cached reference to the specific opportunistically locked file object.

8. At least one non-transitory computer readable storage medium storing a computer program product for accessing opportunistically locked files in real-time from a kernel mode file system filter driver without breaking opportunistic locks, the computer program product comprising:
   program code for monitoring a file system by monitoring file system control codes indicative of opportunistic lock ("oplock") status;
   program code for detecting a granting of an opportunistic lock to a specific file object referring to a specific underlying file, the granting of the opportunistic lock resulting in the specific file object and the specific underlying file being opportunistically locked;
   program code for caching a reference to the specific opportunistically locked file object;
   program code for filtering, by the kernel mode file system filter driver, a request to access the specific opportunistically locked file via a second file object, the second file object not being opportunistically locked; and
   program code for using, by the kernel mode file system filter driver, the cached reference to the specific opportunistically locked file object instead of the second file object to access the specific opportunistically locked underlying file;
   wherein using the cached reference to the specific opportunistically locked file object to access the specific opportunistically locked underlying file further comprises accessing the specific opportunistically locked underlying file in real-time from the kernel mode file system filter driver without breaking the granted opportunistic lock.

9. The computer program product of claim 8 wherein the program code for caching the reference to the specific opportunistically locked file object further comprises:
   program code for caching the reference to the specific opportunistically locked file object in a stream context describing the specific opportunistically locked underlying file on disk.

10. The computer program product of claim 8 wherein the program code for using, by the kernel mode file system filter driver, the cached reference to the specific opportunistically locked file object instead of the second file object to access the specific opportunistically locked underlying file further comprises:

program code for using, by the kernel mode file system filter driver, the cached reference to the specific opportunistically locked file object instead of the second file object to access the specific opportunistically locked underlying file and perform processing functionality provided by the kernel mode file system filter driver to the specific opportunistically locked underlying file.

11. The computer program product of claim 10 wherein the program code for performing the processing functionality provided by the kernel mode file system filter driver to the specific opportunistically locked underlying file further comprises:

program code for scanning the specific opportunistically locked underlying file for malicious code, by the kernel mode file system filter driver.

12. The computer program product of claim 10 wherein the program code for performing the processing functionality provided by the kernel mode file system filter driver to the specific opportunistically locked underlying file further comprises:

program code for backing up the specific opportunistically locked underlying file, by the kernel mode file system filter driver.

13. The computer program product of claim 8 wherein the program code for using, by the kernel mode file system filter driver, the cached reference to the specific opportunistically locked file object instead of the second file object to access the specific opportunistically locked underlying file further comprises:

program code for using, by the kernel mode file system filter driver, the cached reference to the specific opportunistically locked file object instead of the second file object to access the specific opportunistically locked underlying file and perform redirected filtered input/output to the specific opportunistically locked underlying file.

14. The computer program product of claim 8 further comprising:

program code for detecting a releasing of an opportunistic lock of the specific file object referring to the specific underlying file, the releasing of the opportunistic lock resulting in the specific file object and the specific underlying file not being opportunistically locked; and program code for releasing the cached reference to the specific opportunistically locked file object.

15. A computer system for accessing opportunistically locked files in real-time from a kernel mode file system filter driver without breaking opportunistic locks, the computer system comprising:

at least one processor;
    computer memory;
    means for monitoring a file system by monitoring file system control codes indicative of opportunistic lock ("oplock") status;

means for detecting a granting of an opportunistic lock to a specific file object referring to a specific underlying file, the granting of the opportunistic lock resulting in the specific file object and the specific underlying file being opportunistically locked;

means for caching a reference to the specific opportunistically locked file object;

means for filtering, by the kernel mode file system filter driver, a request to access the specific opportunistically locked file via a second file object, the second file object not being opportunistically locked; and means for using, by the kernel mode file system filter driver, the cached reference to the specific opportunistically locked file object instead of the second file object to access the specific opportunistically locked underlying file;

wherein using the cached reference to the specific opportunistically locked file object to access the specific opportunistically locked underlying file further comprises accessing the specific opportunistically locked underlying file in real-time from the kernel mode file system filter driver without breaking the granted opportunistic lock.

16. The computer system of claim 15 wherein the means for using, by the kernel mode file system filter driver, the cached reference to the specific opportunistically locked file object instead of the second file object to access the specific opportunistically locked underlying file further comprises:

means for using, by the kernel mode file system filter driver, the cached reference to the specific opportunistically locked file object instead of the second file object to access the specific opportunistically locked underlying file and perform processing functionality provided by the kernel mode file system filter driver to the specific opportunistically locked underlying file.

17. The computer system of claim 15 wherein the means for using, by the kernel mode file system filter driver, the cached reference to the specific opportunistically locked file object instead of the second file object to access the specific opportunistically locked underlying file further comprises:

means for using, by the kernel mode file system filter driver, the cached reference to the specific opportunistically locked file object instead of the second file object to access the specific opportunistically locked underlying file and perform redirected filtered input/output to the specific opportunistically locked underlying file.

18. The computer system of claim 15 further comprising:

means for detecting a releasing of an opportunistic lock of the specific file object referring to the specific underlying file, the releasing of the opportunistic lock resulting in the specific file object and the specific underlying file not being opportunistically locked; and means for releasing the cached reference to the specific opportunistically locked file object.

\* \* \* \* \*